No. 745,257. PATENTED NOV. 24, 1903.
F. M. STEADMAN.
MEASURING DEVICE.
APPLICATION FILED SEPT. 28, 1901.
NO MODEL.

WITNESSES:
James F. Duhamel
Geo. J. Hosker

INVENTOR
Frank M. Steadman
BY
ATTORNEYS

No. 745,257. Patented November 24, 1903.

UNITED STATES PATENT OFFICE.

FRANK M. STEADMAN, OF PUEBLA, MEXICO, ASSIGNOR OF ONE-HALF TO GUS E. TRAGER, OF PUEBLA, MEXICO.

MEASURING DEVICE.

SPECIFICATION forming part of Letters Patent No. 745,257, dated November 24, 1903.

Application filed September 28, 1901. Serial No. 76,878. (No model.)

*To all whom it may concern:*

Be it known that I, FRANK M. STEADMAN, a citizen of the United States of America, and a resident of Puebla, in the State of Puebla and Republic of Mexico, have invented a new and Improved Measuring Device, of which the following is a full, clear, and exact description.

The object of the invention is to provide a new and improved measuring device more especially designed for measuring surfaces or openings in a very quick and convenient manner and without requiring mechanical calculations.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
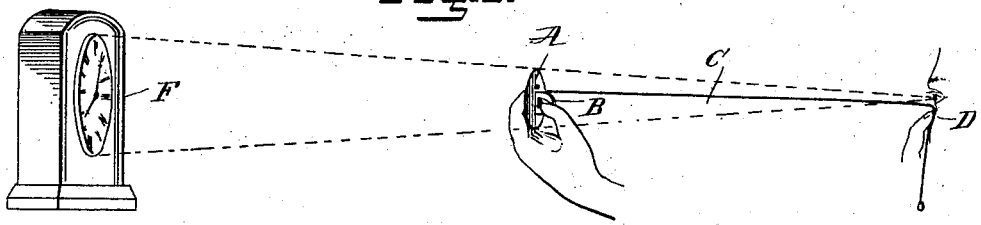
Figure 2:
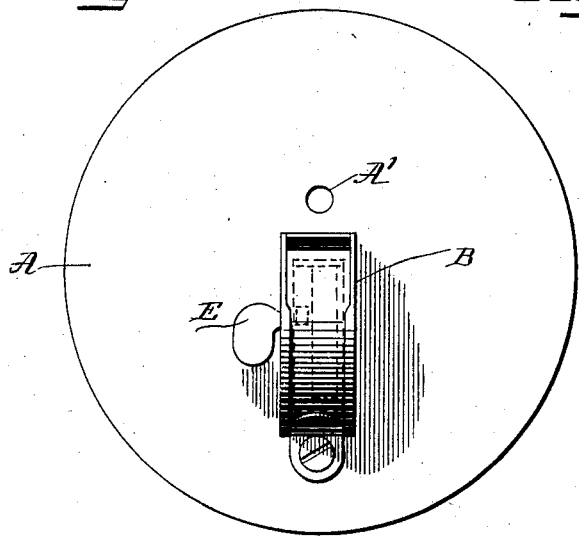
Figures 3, 4:
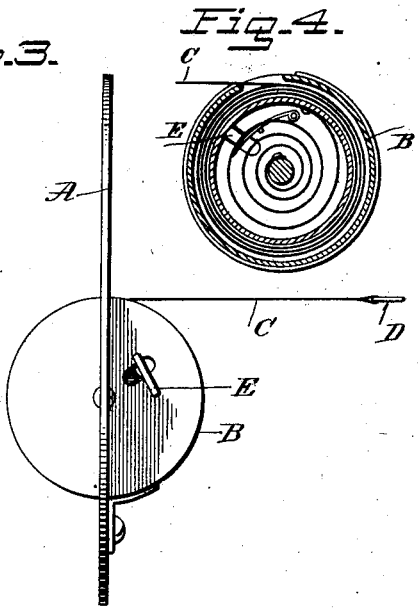
Figure 5:
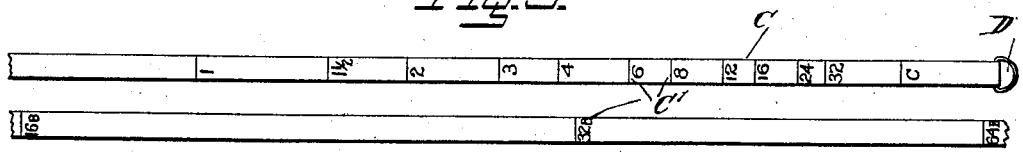
Figure 6:
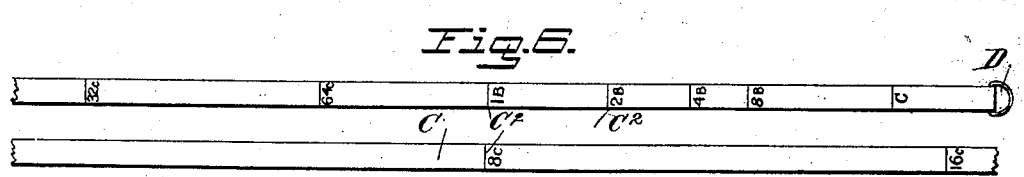

Figure 1 is a perspective view of the improvement as applied. Fig. 2 is an enlarged face view of the improvement. Fig. 3 is a side elevation of the same. Fig. 4 is a rear sectional elevation of the tape-casing; and Figs. 5 and 6 are top and bottom views of the tape used in the device, the tape for convenience being shown in each view as separated into two sections.

The improved measuring device consists, essentially, of a surface-plane preferably in the form of a disk A, on which is secured a tape-casing B, in which winds and unwinds a tape C, provided at its outer end with a suitable handle D, adapted to be taken hold of by the operator to draw the tape C out of the casing or to allow the tape to wind up in the casing, as indicated in Fig. 4. A suitable locking and releasing device E is provided on the casing B and is under the control of the operator to stop and lock the tape C in position after the same has been drawn out of the casing a desired distance, as hereinafter more fully explained, the said device when released allowing the tape to rewind in the casing in the usual manner. As this part of the device may be of any well-known construction further description thereof is not deemed necessary. The casing B and its tape C are so arranged relative to the disk A that when the tape C is drawn out it extends approximately centrally to the disk A and at right angles thereto, as will be readily understood by reference to the drawings. The tape C is provided on its upper and lower faces with graduations $C'$ and $C^2$, respectively, (see Figs. 5 and 6,) of which the graduation $C'$ is used in connection with the surface-plane or disk A and the bottom graduation $C^2$ is used in connection with an aperture $A'$, formed in the surface-plane or disk A, the said aperture $A'$ serving for viewing small objects the surface of which is to be measured by the device. It is understood that the diameter of the disk A is predetermined—say ten centimeters—and the aperture $A'$ has a likewise predetermined diameter—say five millimeters—and the graduations $C'$ $C^2$ have values corresponding to the predetermined diameters of the disk and the aperture. The tape C is also provided with a line or point $c$, from which the measurement is made.

The opening $A'$ because of its being one-twentieth of the diameter of the disk A will make the same measure of any surface with one-twentieth the length of tape as would be made with the disk A, using twenty times the length of tape. Thus by the use of the small opening $A'$, I avoid the necessity of a very long tape that could not be handled by one person alone.

The theory of measurement involved is as follows: The point "$c$" on the tape is always the center from which the measurement is made. A hollow sphere or globe of any size, with the eye of the observer supposed to be at the center, would shut off from the observer everything in every direction outside of the sphere. As a circle is a line that bounds and measures the directions outward from or in toward a center point on a plane surface so a sphere or globe is a surface which bounds and measures all the directions outward from or in toward a center point not only along a plane, as does the circle, but in every possible direction. If lines be drawn from each limit of the boundary of any portion of the surface of a sphere or globe to the center of the sphere, the intersection of these lines with the surface of any concentric sphere will form the boundary of a portion of such surface the area of which will have the same ratio to that of the entire surface of the lastnamed sphere as did the corresponding area of the said portion of the first-named sphere to its entire area. Consequently if lines be drawn from each element of the periphery of any plane surface to a point outside the surface and opposite the center thereof these lines will cut from all spheres concentric with said point areas which in each case will bear the same constant ratio to the entire area of the sphere to which said area belongs. This is true no matter how far into space the concentric spheres may be supposed to extend. The whole sky may be regarded as such a surrounding surface and the visible expanse of sky as the half of such a surrounding sphere or globe. Any circle of fixed size—say a fine wire circle of ten centimeters in diameter—placed on the surface of any globe (whose diameter is not less than that of the circle) will inclose a certain area, which will be in any case some exact fractional part of the whole area of that globe. The larger the globe the less would be the fractional part of its whole surface that would be outlined by or inclosed in the circle when placed against it. To ascertain the dimensions of a globe upon whose surface such a circle would inclose an exact predetermined part of the whole area, as one-fourth or one sixty-fourth, is simply a mathematical problem.

Based on the above truths the measurement is made as follows:

First. The surface of a sphere or globe is divided into one hundred and twenty-eight parts called "units," each unit into one hundred and twenty-eight parts called "B units," each B unit into one hundred and twenty-eight parts called "C units."

Second. The diameter of the circular sphere-section, which is to be the measure of exact fractional parts of the sphere-surface, is for reasons of convenience chosen to be ten centimeters, which is the diameter of the circle of such a section measured across the flat side of that section after it is supposed to be cut off from the sphere. The flat side of such a sphere-section is what is represented, respectively, by the disk A and the small opening A' in the measuring device. The disk when viewed from a given point, as the center "$c$," subtends a certain definite portion of the area of a sphere concentric with the said point, and the graduation C' on the tape expresses this ratio for particular positions of the disk, while the graduation $C^2$ expresses this ratio for the opening A' in the disk.

Third. The sizes of the different spheres or globes in which the circular section of constant diameter will occupy thirty-two, sixteen, eight, four, two, one, and the intermediates twenty-four, twelve, six, three, one and one-half units, or one hundred and twenty eighths of the sphere-surface, were found by mathematical calculation; also, the sizes of the spheres in which the constant disk of ten centimeters will occupy sixty-four, thirty-two, and sixteen B units or one hundred and twenty eighths of a unit of the sphere-surface; also, the sizes of the spheres in which the smaller constant disk or opening of five millimeters will measure eight, four, two, one B units or one hundred and twenty eighths of a unit, and sixty-four, thirty-two, sixteen, and eight C units of the sphere-surface, or one hundred and twenty eighths of a B unit. The disk A and small opening A' are always in theory supposed to be a part of the entire sphere-surface, just as in speaking of a certain number of degrees we know that in theory the "degrees" are parts of complete circles and that whether those circles reach to the stars or are only outlined on a small piece of paper in front of our eyes there is no difference in the thought of degrees that is involved, as it is a "relative" and not an "absolute" measurement. So it is in measuring with the device. When the disk A of ten centimeters occupies thirty-two one hundred and twenty eighths of a whole sphere-surface, large or small, in relation to its center point, the disk is only M.0289 from that center-point, which is "$c$" on the tape. As thirty-two one hundred and twenty eighths is equal to one-fourth of the entire sphere-surface it is very plain that the disk must be very close to the center-point in order to occupy so much of the sphere-surface. Now when the disk occupies only two one hundred and twenty eighths of the sphere-surface or one sixty-fourth of that surface it is evident that it cannot be so close to the center-point of measurement, or "$c$." We find, in fact, by working out the problem that the disk must be just M.1953 from "$c$." As the disk recedes from "$c$" it occupies less and less of the sphere-surface, just as two points a fixed distance apart occupy less degrees around a point of measurement the more they are removed from that point. The disk A at M.2795 from "$c$" occupies one unit or one one hundred and twenty eighth of the sphere-surface. The disk A at M.3977 from "$c$" occupies one-half unit of sphere-surface. At M.7988 from "$c$" the disk A occupies one-eighth of a unit of sphere-surface or sixteen B units of it. Now as M.7988 is about as far as an arm can conveniently reach to hold the disk the size of the measure is at this point changed to M.005 in diameter, the small opening A', and on the under side of the tape the same center "$c$" is located, and the small opening A' at M.0565 from "$c$" occupies one-sixteenth of a unit of sphere-surface or eight B units of it, and the farther it retires from "$c$" the less sphere-surface it occupies around "$c$," which is the center of measurement. At M.16 from "$c$" it occupies only one one hundred and twenty eighth of one one hundred and twenty eighth of the sphere-surface or one B unit of it. At M.6406 from "C" it occupies only eight one hundred and twenty eighths of one one hundred and twenty eighth of one one hundred and twenty eighth of the sphere-surface or eight C units of it. This is less space than is occupied by the surface of the sun in the heavens, and is, I think, as small a measurement as is necessary to make in the actual use of the meter. The scientists or mathematicians may later reduce the subdivisions to any degree of fineness that they may find desirable.

Fourth. The tape-lengths from "$c$" or the center to the different unit-numerals on the tape where the disk is to be placed is in the case of each particular unit value or numeral the perpendicular of a triangle of which the radius of the corresponding sphere or globe is the hypotenuse and one-half of the disk diameter is the base, the same disk diameter being used in the calculation that was used in calculating the sphere whose radius is the hypotenuse in each calculation.

In using the device for ascertaining the point from which any surface shall be viewed in order that it shall occupy a predetermined number of units—as, for example, the position of the eyes with reference to the clock-face F, as indicated in Fig. 1—the tape is pulled out until the mark at the numeral representing the units desired is even with the disk A, and then the locking device E is actuated to hold the tape in place. The operator then raises the disk in the left hand and, keeping the tape stretched, places the letter "$c$" just below the eye with the right hand, as shown in Fig. 1. In this position the disk measures the chosen number of units in relation to the mark at the letter "$c$" or the eye in practice, and to find the point from which the clock-face F will measure the same the operator must walk toward or from the clock-face until it is seen to coincide with the periphery of the disk A. Then from that point or distance from the clock-face F it is found that it occupies the same number of units as is indicated by the numeral which is placed even with the disk A. (See Fig. 1.) With the meter in this position the clock-face F measures one unit or one one hundred and twenty eighth of a sphere-surface in its relation to the eye of the observer. Whatever be the number of units it is desired that a chosen surface shall occupy that numeral is placed even with the disk A, and the point in front of that surface from which it will measure that number of units is found in the same manner, as previously described. For example, suppose it is desired to find that point from which the clock-face F will measure thirty-two B units or thirty-two one hundred and twenty eighths of one one hundred and twenty eighth of the entire sphere-surface. The line at the numeral "32 B" is placed even with the disk, and with the tape and disk in position, as before explained, the operator walks away until the clock-face F and the disk A coincide. It will now be known that the clock-face F occupies from the point occupied by the eye of the operator and in relation to that point the desired thirty-two one hundred and twenty eighths of one one hundred and twenty eighth of the entire sphere-surface or, as explained, thirty-two B units.

When it is desired to measure objects smaller than the disk or large objects at a distance where they are hidden by the disk at "16 B," then the numbers on the under side of the tape (see Fig. 6) must be placed even with the disk and the measuring done through the aperture A'.

It will be seen that by the use of the device two kinds of measurement can be had—namely, the number of units being predetermined, the problem is to find the point from which the measured surface will measure the desired number of such units, and the other, the point of view being predetermined, to find the number of units the surface occupies when viewed from that point.

To measure from a chosen point the value of any visible surface, such as an opposite wall, a bookcase, or a window, it is necessary to place the line at the center "$c$" of the graduation on the tape against the cheek of the observer, and then the latter presses the locking device E to allow of moving the disk A forward or backward until its rim coincides as nearly as possible with the outlines of the surface to be measured. If the outer rim of the disk cannot be made small enough to measure it, then use is made of the aperture A', as above explained. In using the small aperture A' it is easier to place it close to the eye first and then to move the disk away until the desired point is reached, as the surface to be measured is always in sight through the aperture. When the disk A, however, is used, it is easier to move it far away at first and gradually draw it up until its rim coincides with the surface to be measured, as the surface may be plainly visible while the meter is adjusted relative to the surface. When the measurement is made, the tape number nearest the disk indicates the value of the surface. It is expressly understood that if the rim of the disk A is used the numbers of the graduations on top of the tape C are used; but when the aperture A' is employed then the numbers on the under side of the tape C are used.

In order to prove the usefulness of the device as a measurer of a space through which light is allowed to pass, I proceed as follows: A chair is placed a few steps from a window through which the sky may be seen, and then the measure of the window is taken by the device, as above described. In case the operator is about three steps from the window the value will probably be about one unit, more or less. Suppose it is desired that three units shall be the source of light admitted. Then the operator pulls out the tape to number "3" and then places the chair nearer to the window until the window-opening coincides as nearly as possible with the rim of the disk. When this has been done, the window-opening will have a value of three units. Thus by the use of the device the object to be illuminated by the rays of light entering the window can be at once placed in the proper position, so that the desired amount of light passes upon the object, irrespective of the size of the window.

As the circle always has the same value in degrees no matter what its absolute size may be, so I have divided the sphere into parts or units having the same value whatever the size of the sphere. A line drawn from horizon to horizon up through the zenith measures the half of a bounding circle which we call "one hundred and eighty degrees." So the visible sky as a surrounding surface or expanse we may say measures sixty-four sphere units, just as the half-circle measures one hundred and eighty degrees. As this fact in relation to the sphere or globe does not appear to have been heretofore recognized by scientists, I have been obliged to make such division of the sphere-surface and to establish the unit and scale of measurement as I have thought would be the most practical.

The number (128) was chosen as the number of parts into which the sphere-surface should be divided for convenience only, because such a division seemed to answer best in the use of the measurement itself. For instance, in the practical use of the measure in measuring a visible expanse of sky as seen through a window-opening the amount that should be used in taking a portrait by photography is from three to six units of that sky. It is seen that these are convenient numbers and that by the chosen division into one hundred and twenty-eight parts or units those parts are made of convenient value in practice.

A special reason why one hundred and twenty-eight was chosen is because it is a number that can be divided continuously by two without resulting in a fraction until after arriving at unity, and then the use of fractions is avoided by dividing the unit again into one hundred and twenty-eight parts or B units and the B unit again into one hundred and twenty-eight parts or C units.

Having thus described my invention, I claim as new and desire to secure by Letters Patent—

1. A measuring device consisting of a tape provided with a series of graduations and having an extreme graduation $c$ at or near one end, the said extreme graduation or point forming a sphere-center, and a flat circular disk of predetermined diameter correlating to the values of the graduations on the tape, the said disk being arranged to subtend more or less of said sphere-surface, equal, when the disk is at any particular graduation on the tape and at right angles thereto, to such fractional part of the area of the sphere-surface as is expressed by said graduation, as set forth.

2. A measuring device consisting of a tape provided with a series of graduations and having an extreme graduation $c$ at or near one end forming a sphere-center and a disk having a small circular opening of predetermined size and correlating to the values of the graduations on the tape, the said opening exposing more or less of said sphere-surface, when viewed from the point or graduation forming the sphere-center, equal, when the disk is at right angles to and at any particular graduation on the tape, to such fractional part of the area of the sphere-surface as is expressed by said graduation.

3. A measuring device comprising a disk, a tape-casing secured thereon, and a tape provided with graduations and winding and unwinding in the said tape-casing, the tape being arranged to extend approximately from the center of said disk and at right angles to the face thereof, whereby when the disk is at any particular graduation on the tape the edges of the disk may be equidistant from a point on said tape representing the center from which the measurement is made, as set forth.

4. A measuring device having a disk, and a tape adjustably connected with the disk and working at right angles thereto, said tape having graduations, each representing the ratio of that portion of the maximum surface of a sphere that may be subtended by the disk when viewed from the sphere-center and the tape adjusted to said center, to that of the entire sphere, as set forth.

5. A measuring device having a disk formed with an aperture, a tape adjustably connected with the disk and having graduations, each representing the ratio of that portion of the surface of a sphere exposed through the said aperture in the disk when viewed from the sphere-center and the tape adjusted to said center, to that of the entire sphere, the tape, when in operative position, being at right angles to the plane of the disk, as set forth.

6. A measuring device having a tape provided with graduations each representing the ratio of that portion of the maximum surface of a sphere subtended by a disk of predetermined size when viewed from the sphere-center and the tape adjusted to said center, to that of the entire sphere, as set forth.

7. A measuring device having a tape provided with graduations and having a mark indicating the center from which the measurement is made, and a disk used in connection with the tape, the tape being arranged to extend approximately from the center of said disk and at right angles to the face thereof, the disk when viewed from the measuring-center on the tape, subtending a definite portion of the area of an imaginary sphere concentric with said measuring-center, the said graduations on the tape expressing this ratio for particular positions of the disk, as set forth.

8. A measuring device, comprising a disk of predetermined size, having an aperture also of predetermined size relative to that of the disk, a tape-casing secured to the said disk, below said aperture, and a tape winding and unwinding in the said tape-casing and at right angles to the face of said disk, the said tape being provided with graduations, representing the ratio of that portion of the surface of a sphere that may be subtended by the disk, when viewed from the sphere-center and the tape adjusted to said center, to that of the entire sphere, the tape also having graduations representing the ratio of that portion of the surface of a sphere exposed through said aperture, to that of the entire sphere, the tape being also adjusted to the sphere-center when the aperture is employed, as set forth.

9. A measuring device, comprising a disk having a slot formed therein, a tape-casing secured in said slot and projecting beyond the faces of the disk, and a tape winding and unwinding in the said tape-casing and at right angles to the disk, as set forth.

10. A measuring device comprising a disk of predetermined diameter, the said disk being provided with an aperture also of predetermined diameter relative to that of the disk, and a tape having a measuring-point thereon, representing the center of an imaginary globe or sphere, the said tape being adjustable at right angles to the said disk, and provided with graduations on one side indicating divisions and subdivisions of a complete sphere or globe surface and having values corresponding to the size of the disk, and graduations on the other side of said tape indicating subdivisions of a sphere-surface and having values corresponding to the size of the aperture in the disk, the disk when viewed from the measuring-point on the tape subtending a definite portion of the area of the imaginary sphere concentric with said point, the first-mentioned graduations on the tape expressing this ratio for particular positions of the disk and the other graduations expressing this ratio for the aperture in the disk, as set forth.

11. A measuring device, comprising a disk of predetermined diameter and a tape arranged to extend at right angles to the disk, the said tape being provided with graduations indicating divisions and subdivisions of a complete globe or sphere surface, the graduations having values corresponding to the size of the disk, the said tape having a graduation at or near its outer end representing the center of an imaginary globe to be measured, the said disk when placed at any particular graduation on the tape subtending more or less of the globe-surface according to its distance from the said extreme graduation, thereby allowing the disk to become at will the measure of a large section of a small globe or a gradually smaller section of a larger globe.

12. A measuring device comprising a disk of predetermined diameter, and a tape arranged to extend at right angles to said disk and provided with a graduation representing a sphere-center, and a series of graduations, having values corresponding to the diameter of the disk, the said graduations representing divisions and subdivisions of said sphere-surface and at which said disk may be placed to subtend exact fractional parts of the sphere-surface, when the disk is viewed from the point representing the sphere-center.

13. A measuring device, comprising a tape provided with graduations forming a scale representing divisions and subdivisions of the total surface of a sphere, the said graduations comprising unit-graduations each representing one one hundred and twenty eighth of the total area of the sphere-surface, and graduations representing divisions of said unit-graduations, and a disk of predetermined size used in connection with and at right angles to the tape, the graduation of the tape having values corresponding to the size of the disk, the tape having a measuring-point at or near its end indicating an imaginary sphere-center, the disk when placed at any particular graduation on the tape and viewed from the said measuring-point subtending the exact fractional part of a sphere-surface indicated by said graduation, as set forth.

14. A measuring device, comprising a disk of predetermined diameter, the said disk being provided with a circular opening also of predetermined diameter relative to that of the disk, and a tape having a point indicating the center from which the measurement is made, the said tape being provided with a series of graduations forming a scale representing divisions and subdivisions of a globe-surface, the scale having unit-graduations each representing one one hundred and twenty eighth of the total area of a globe-surface, B unit-graduations each representing one one hundred and twenty eighth of a unit in value and C unit-graduations each representing one one hundred and twenty eighth of a B unit in value, one face of the said tape being provided with said graduations from thirty-two units down to sixteen B units, the said graduations, when the tape is extended at right angles to the disk, being used in connection with the disk as the latter is moved to and from the point of measurement on the tape, the disk, when at any particular graduation on the tape, and viewed from the point of measurement, subtending a definite portion of the area of an imaginary sphere concentric with said point of measurement, the said graduation at which the disk is placed expressing this ratio, the other face of the tape having graduations from eight B units to eight C units and used in a similar manner in connection with the opening in the disk, as set forth.

In testimony whereof I have signed my name to this specification in the presence of two witnesses.

FRANK M. STEADMAN.

Witnesses:
O. B. HACHENBERGER,
HERBERT DENNIS.